United States Patent [19]

Eto et al.

[11] Patent Number: 5,111,441

[45] Date of Patent: May 5, 1992

[54] APPARATUS FOR GENERATING MAGNETIC FIELD VARYING IN RESPONSE TO AN INFORMATION SIGNAL

[75] Inventors: Hiroshi Eto, Tokyo; Nobuyuki Oka, Kanagawa; Takehiro Nagaki, Miyagi, all of Japan

[73] Assignee: Sony Corporation, Tokyo, Japan

[21] Appl. No.: 650,607

[22] Filed: Feb. 5, 1991

[30] Foreign Application Priority Data

Feb. 6, 1990 [JP] Japan .......................... 2-26861

[51] Int. Cl.⁵ .................. G11B 11/00; G11B 13/00; G11B 5/02; G11B 15/04
[52] U.S. Cl. .......................... 369/13; 369/13; 369/14; 360/59; 360/60; 360/66; 360/114
[58] Field of Search .............. 369/13, 14, 43, 126; 360/114, 122, 125, 60, 66, 59

[56] References Cited

U.S. PATENT DOCUMENTS

| | | | |
|---|---|---|---|
| 4,639,906 | 1/1987 | Goto | 369/14 |
| 4,837,758 | 6/1989 | Motoyama et al. | 369/13 |
| 4,843,600 | 6/1989 | Miyajima et al. | 369/13 |

FOREIGN PATENT DOCUMENTS

| | | | |
|---|---|---|---|
| 0336423 | 10/1989 | European Pat. Off. | 369/13 |
| 0393652 | 10/1990 | European Pat. Off. | 369/13 |
| 05143 | 1/1988 | Japan | 369/13 |

Primary Examiner—Stuart S. Levy
Assistant Examiner—Tien Ba Pham
Attorney, Agent, or Firm—Lewis H. Eslinger; Jay H. Maioli

[57] ABSTRACT

An apparatus for generating a magnetic field varying in response to an information signal, which comprises a base plate made of electrical insulating material, a magnetic core mounted on one of opposite surfaces of the base plate, the magnetic core having a central leg portion extending through a hole formed in the base plate so as to cause its end face to appear on the other of the opposite surfaces of the base plate, a coil member wound on the central leg portion of the magnetic core to be supplied with a current varying in response to the information signal, and a capacitance detecting electrode formed with a thin conductive layer mounted on the other of the opposite surfaces of the base plate to be opposite to a recording medium having a conductive layer, the capacitance detecting electrode being provided with a cutout for restraining eddy current loss caused in the capacitance detecting electrode.

4 Claims, 2 Drawing Sheets

APPARATUS FOR GENERATING MAGNETIC FIELD VARYING IN RESPONSE TO AN INFORMATION SIGNAL

BACKGROUND OF THE INVENTION

1. Field of the Invention

The present invention relates generally to an apparatus for generating magnetic field varying in response to an information signal, and more particularly, is directed to improvements in an apparatus operative to generate a magnetic field varying in response to an information signal, which is used for recording information signals on a magnetooptic disc with magnetic field modulation.

2. Description of the Prior Art

There has been proposed a so-called optical writable disc as one type of record disc which is available for optically writing an information signal in a record track provided thereon and optically reading an information signal written in the record tracks provided thereon. A magnetooptic disc is one of such optical writable discs and distinguished in that erasure of information signals and writing of the information signals are able to be conducted repeatedly thereon.

The magnetooptic disc comprises a disc-shaped transparent base, a vertically magnetized layer provided for forming a recording layer on a surface of the disc-shaped transparent base, a reflecting layer formed with a thin metallic layer provided on the vertically magnetized layer and a protective layer provided to cover the reflecting layer. Recording of information on the magnetooptic disc is effected by erasing an information signal written therein and writing a new information signal therein, and reproduction of information from the magnetooptic disc is effected by reading an information signal written therein.

In the event of writing of an information signal on the magnetooptic disc, the magnetooptic disc is rotated on an axis of rotation at a central portion thereof and a laser light beam is caused to impinge upon the vertically magnetized layer on a record track portion of the magnetooptic disc, to which a predetermined external magnetic field acts, so that a part of the vertically magnetized layer on the record track portion upon which the laser light beam impinges is magnetized in a direction depending upon the external magnetic field with temperature rise due to impingement of the laser light beam. The information signal is written in the vertically magnetized layer on the record track portion with inversions in the direction of magnetization provided in the vertically magnetized layer by means of a combination of the laser light beam controlled to be constant in intensity and the external magnetic field modulated in direction in response to the information signal or a combination of the laser light beam modulated in intensity in response to the information signal and the external magnetic field produced to be constant in direction.

For writing the information signal in the vertically magnetized layer of the magnetooptic disc with the combination of the laser light beam controlled to be constant in intensity and the external magnetic field modulated in direction in response to the information signal, a magnetic field generating apparatus which is operative to generate a magnetic field varying in response to the information signal and to cause the magnetic field thus generated to act to the vertically magnetized layer of the magnetooptic disc is employed. The magnetic field generating apparatus includes as a main component a magnetic head comprising a magnetic core and a coil wound on the magnetic core to be supplied with a current varying in response to the information signal. It is preferable that the magnetic field generated by the magnetic field generating apparatus to be applied to the vertically magnetized layer of the magnetooptic disc be provided with sufficiently large intensity for acting on the vertically magnetized layer of the magnetooptic disc, and therefore the magnetic head included in the magnetic field generating apparatus is required to be disposed at a position as close as possible to the surface of the magnetooptic disc.

However, it is usual that the magnetooptic disc is rotated with a portion surrounding a central portion thereof and being subjected to periodic deviations in a direction of an axis of rotation during the rotation of the magnetooptic disc, so that it is very difficult to maintain the magnetic head included in the magnetic field generating apparatus to be close to but not to contact the surface of the magnetooptic disc without any particular control for the position of the same. Accordingly, there has been proposed a servocontrol system for the magnetic head included in the magnetic field generating apparatus wherein the magnetic head is mounted on an actuator and variations in a space between the magnetic head mounted on the actuator and the surface of the magnetooptic disc are detected to produce a detection output which is used for driving the actuator to keep the space between the magnetic head mounted on the actuator and the surface of the magnetooptic disc at a predetermined small value regardless of the periodic deviations of the portion of the magnetooptic disc during the rotation of the magnetooptic disc.

In the operation of such a servocontrol system, detection of the variations in the space between the magnetic head and the surface of the magnetooptic disc is achieved, for example, by detecting variations in capacitance between the magnetic head and the reflecting layer provided in the magnetooptic disc.

For detecting the variations in capacitance between the magnetic head and the reflecting layer provided in the magnetooptic disc in order to carry out the detection of the variations in the space between the magnetic head and the surface of the magnetooptic disc, which is required in the servocontrol system for keeping the space between the magnetic head and the surface of the magnetooptic disc at the predetermined small value regardless of the periodic deviations of the portion of the magnetooptic disc during the rotation of the magnetooptic disc, it is necessary to provide a capacitance detecting electrode to be opposite to the magnetooptic disc and to move together with the magnetic head. For meeting this requirement, the capacitance detecting electrode is attached to the magnetic head or the actuator on which the magnetic head is mounted so as to be driven by the actuator together with the magnetic head. However, this results in a disadvantage that the magnetic field generating apparatus including the magnetic head, the actuator and the capacitance detecting electrode results in a complicated configuration and is large in size, and also in another disadvantage that the actuator is burdened with driving a heavy load. Further, in the magnetic field generating apparatus including the magnetic head, the actuator and the capacitance detecting electrode, it would be feared that an eddy current is induced in the capacitance detecting electrode due to the magnetic field generated by the magnetic head and that the capacitance detecting electrode would be undesirably heated by means of eddy current loss.

OBJECTS AND SUMMARY OF THE INVENTION

Accordingly, it is an object of the present invention to provide an apparatus for generating a magnetic field varying in response to an information signal and being caused to act on a recording medium such as a magnetooptic disc, which avoids the aforementioned disadvantages encountered with the prior art.

Another object of the present invention is to provide an apparatus for generating a magnetic field varying in response to an information signal and being caused to act on a recording medium such as a magnetooptic disc, which is provided with a capacitance detecting electrode for detecting variations in a space between the apparatus and the recording medium without increases in size and weight and easily controlled in being response to a detection output of the variations in the space so as to keep its position properly close to the recording medium.

A further object of the present invention is to provide an apparatus for generating a magnetic field varying in response to an information signal and being caused to act to a recording medium such as a magnetooptic disc, which is provided with a capacitance detecting electrode for detecting variations in a space between the apparatus and the recording medium and in which an eddy current induced in the capacitance detecting electrode due to the magnetic field acting to the recording medium is effectively reduced.

According to the present invention, there is provided an apparatus for generating magnetic field varying in response to an information signal, the apparatus comprising a base plate made of the insulating material, a magnetic core mounted on one of opposite surfaces of the base plate, the magnetic core having a central leg portion extending through a hole formed on the base plate so as to cause its end face to appear on the other of the opposite surfaces of the base plate, a coil member wound on the central leg portion of the magnetic core to be supplied with a current varying in response to the information signal, and a capacitance detecting electrode formed with a thin conductive layer mounted on the other of the opposite surfaces of the base plate to be opposite to a recording medium having a conductive layer, the capacitance detecting electrode being provided with a portion for restraining eddy current loss caused therein.

In the apparatus thus constituted in accordance with the present invention, the magnetic field which is generated by the current flowing through the coil wound on the central leg portion of the magnetic core that varies in response to the information signal is guided through the central leg portion of the magnetic core to act effectively on the recording medium. The apparatus is constructed to be relatively small in size and light in weight with the magnetic core mounted on one of the opposite surfaces of the base plate to be provided with the coil wound thereon and the capacitance detecting electrode formed with the thin conductive layer mounted on the other of the opposite surfaces of the base plate, and is able to detect substantially variations in a space between the apparatus and the recording medium by means of the capacitance detecting electrode so as to be easily controlled in response to a detection output of the variations in the space to keep its position properly close to the recording medium.

Further, in the apparatus, the capacitance detecting electrode mounted on the other of the opposite surfaces of the base plate is provided with the portion for restraining the eddy current loss and therefore an eddy current which is induced in the capacitance detecting electrode due to the magnetic field generated on act to the recording medium is effectively reduced so that the eddy current loss caused in the capacitance detecting electrode is surely restrained.

The above and other objects, features and advantages of the present invention will become apparent from the following detailed description which is to be read in conjunction with the accompanying drawings.

DESCRIPTION OF THE PREFERRED EMBODIMENT

Figure 1:
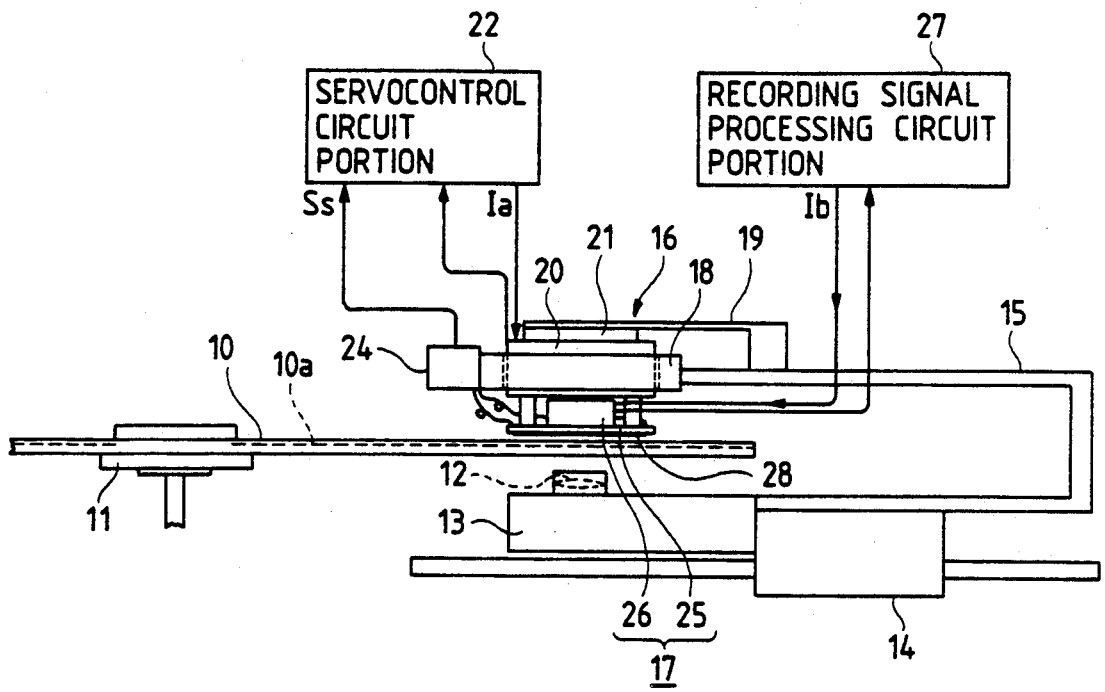
FIG. 1 is a schematic illustration showing an example of an information recording arrangement for writing an information signal in a magnetooptic disc with magnetic field modulation, to which an embodiment of apparatus for generating a magnetic field varying in response to an information signal according to the present invention is applied.

FIG. 1 shows an information recording arrangement for writing an information signal in a magnetooptic disc with magnetic field modulation, to which an embodiment of apparatus for generating a magnetic field varying in response to an information signal according to the present invention is applied.

Referring to FIG. 1, a magnetooptic disc 10 is set on a disc driving table 11 with a central hole provided thereon to engage with a central projection formed on the disc driving table 11. The disc driving table 11 is operative to rotate the magnetooptic disc 10 at a predetermined speed of rotation. The magnetooptic disc 10 has a vertically magnetized layer provided on a transparent base plate for forming a record track area 10a in which a plurality of convolutions of a record track are to be formed concentrically to surround the central hole, a conductive reflecting layer formed with metal evaporation to cover the record track area 10a, and a protective layer put on over the conductive reflecting layer.

An optical block 13 having an objective lens 12 for causing an laser light beam substantially constant in intensity to impinge upon the record track area 10a of the magnetooptic disc 10 is mounted on an optical block driving device 14 arranged under the magnetooptic disc 10 that is supported by the disc driving table 11. The optical block driving device 14 is operative to move the optical block 13 in a direction of the radius of the magnetooptic disc 10, so that the laser light beam impinging upon the record track area 10a through the objective lens 12 is able to reach overall portions of the record track area 10a.

An actuator 16 and a magnetic field generator 17 which constitutes one embodiment of apparatus for generating a magnetic field varying in response to an information signal according to the present invention and which is attached to the actuator 16 are supported by a supporting arm member 15 above the magnetooptic disc 10 that is supported by the disc driving table 11. The supporting arm member 15 extends from the optical block driving device 14 to be moved together with the optical block 13. The actuator 16 comprises a ring magnet 18 fixed to the end portion of the supporting arm member 15 and a movable member 21 supported to be able to move up and down by a resilient holder member 19 extending from the supporting arm member 15 and provided with a driving coil 20 fixed thereto. The driving coil 20 is supplied with a driving current Ia from a servocontrol circuit portion 22 and operative to move the movable member 21, by which the driving coil 20 is supported, up and down in relation to the ring magnet 18 fixed to the supporting arm member 15 in accordance with the driving current Ia.

The magnetic field generator 17 comprises a base plate 25 made of insulating material and a magnetic head 26 mounted on the upper surface of the base plate 25. The upper surface of the base plate 25 is attached through connecting members to the movable member 21 of the actuator 16, so that the magnetic field generator 17 in its entirety moves together with the movable member 21. The magnetic head 26 is supplied with a driving current Ib varying in response to a recording information signal from a recording signal processing circuit portion 27 and is operative to generate a magnetic field varying in response to the recording information signal, namely, a recording information signal magnetic field, in accordance with the driving current Ib.

A capacitance detecting electrode 28 formed with a thin conductive layer is attached to the lower surface of the base plate 25 disposed above the magnetooptic disc 10 so as be opposite to the upper surface of the magnetooptic disc 10. Variations in capacitance between the capacitance detecting electrode 28 and the conductive reflecting layer provided in the magnetooptic disc 10 are detected through the capacitance detecting electrode 28. A detection output of the variations in capacitance between the capacitance detecting electrode 28 and the conductive reflecting layer provided in the magnetooptic disc 10 is obtained from an oscillator circuit portion 24 attached to the ring magnet 18 of the actuator 16. The oscillator circuit portion 24 is connected to the capacitance detecting electrode 28 and constituted to use the capacitance between the capacitance detecting electrode 28 and the conductive reflecting layer provided in the magnetooptic disc 10 as one of the parameters for determining its oscillating frequency, so that the oscillating frequency in the oscillator circuit portion 24 varies in response to the variations in capacitance between the capacitance detecting electrode 28 and the conductive reflecting layer provided in the magnetooptic disc 10. Consequently, the variations in capacitance between the capacitance detecting electrode 28 and the conductive reflecting layer provided in the magnetooptic disc 10 are detected as variations in frequency of an oscillation output Ss obtained from the oscillator circuit portion 24.

The oscillation output Ss obtained from the oscillator circuit portion 24 is supplied to the servocontrol circuit portion 22 and the servocontrol circuit portion 22 is operative to vary the level of the driving current Ia supplied to the driving coil 20 of the actuator 16 in response to the variations in frequency of the oscillation output Ss and therefore to cause the movable member 21 of the actuator 16 to move. With the movement of the movable member 21 of the actuator 16, the magnetic head 26 is moved to vary the space between the capacitance detecting electrode 28 and the magnetooptic disc 10. As a result, the capacitance between the capacitance detecting electrode 28 and the conductive reflecting layer provided in the magnetooptic disc 10 is varied so as to maintain a predetermined value and therefore the space between the capacitance detecting electrode 28 and the magnetooptic disc 10 is controlled to be constant.

Figure 3:
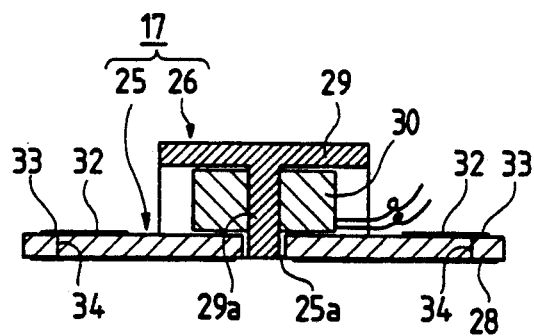
FIG. 3 is a schematic cross sectional view of the embodiment according to the present invention shown in FIGS. 2A to 2D.

In the magnetic field generator 17 having the magnetic head 26 mounted on the upper surface of the base plate 25 and the capacitance detecting electrode 28 attached to the lower surface of the base plate 25, as shown in FIGS. 2A to 2D, the magnetic head 26 comprises a magnetic core 29 with a central leg portion 29a fixed on the upper surface of the base plate 25 and a coil 30 wound on the central leg portion 29a of the magnetic core 29. The coil 30 is supplied with the driving current Ib varying in response to the recording information signal from the recording signal processing circuit portion 27. As shown clearly in FIG. 3, the central leg portion 29a of the magnetic core 29 extends through a central opening of the coil 30 and a hole 25a formed on a central portion of the base plate 25 to cause the end face thereof to appear on the lower surface of the base plate 25.

Figure 2A:
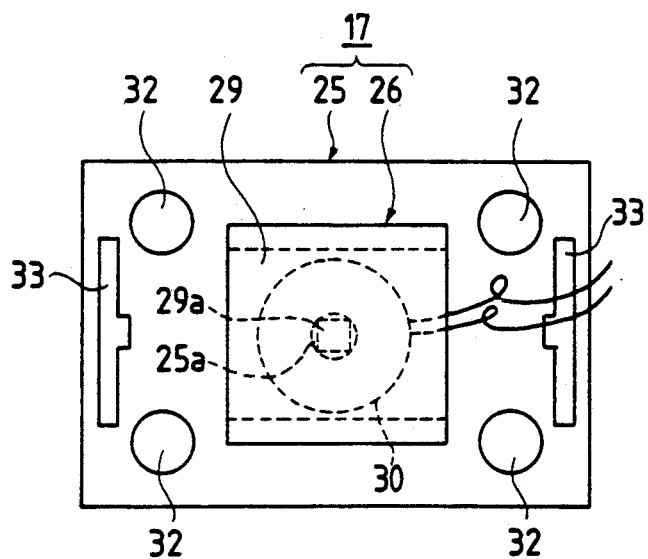
FIGS. 2A, 2B, 2C and 2D are schematic plan, front, side and bottom views, respectively, each showing the embodiment according to the present invention applied to the information recording arrangement shown in FIG. 1.
Figure 2C:
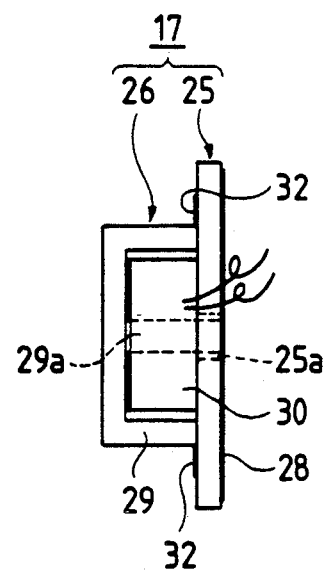
Figure 2B:
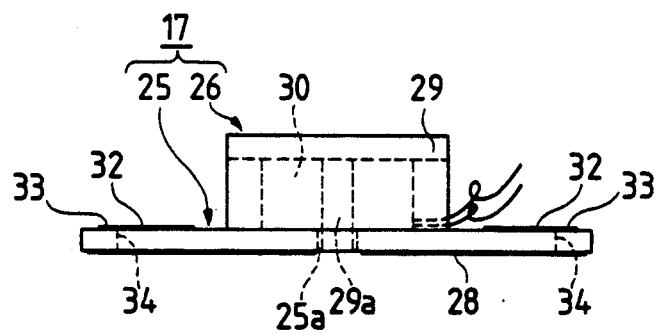
Figure 2D:
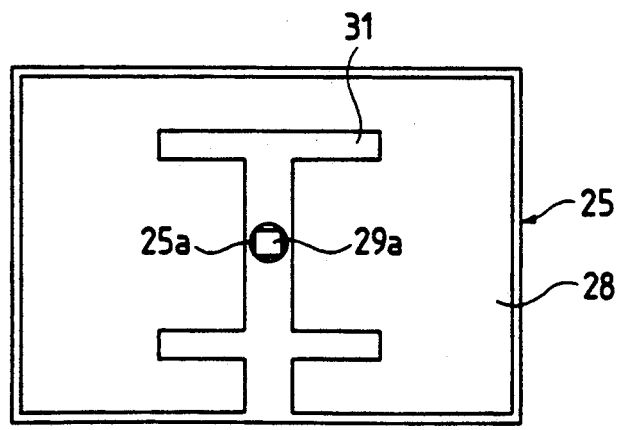

As shown in FIG. 2D, the capacitance detecting electrode 28 attached to the lower surface of the base plate 25 is provided with a separating cutout 31 which forms an eddy current loss restraining portion. The separating cutout 31 extends linearly to include a portion of the lower surface of the base plate 25 at which the end face of the central leg portion 29a of the magnetic core 29 appears. The capacitance detecting electrode 28 is provided to cover almost all portions of the lower surface of the base plate 25 with the exception of portions corresponding to the separating cutout 31.

Four coupling portions 32 are formed with thin conductive layers on the upper surface of the base plate 25 to be coupled with the connecting members extending from the movable member 21 of the actuator 16. Further, a couple of connecting electrodes 33 are also formed with thin conductive layers on the upper surface of the base plate 25 to be connected through conductors 34 each filling in a hole extending through the base plate 25 to the capacitance detecting electrode 28 attached to the lower surface of the base plate 25 and also connect to the oscillator circuit portion 24 fixed to the ring magnet 18 of the actuator 16 when the coupling portions 32 are coupled with the connecting members extending from the movable member 21 of the actuator 16, so that the capacitance detecting electrode 28 is connected through the conductors 34 and connecting electrodes 33 to the oscillator circuit portion 24.

The magnetic field generator 17 thus constituted and attached through the connecting members to the movable member 21 of the actuator 16 is disposed to cause the capacitance detecting electrode 28 to be opposite to the magnetooptic disc 10. Then, the recording information signal magnetic field which is generated by supplying the coil 30 of the magnetic head 26 with the driving current Ib varying in response to the recording information signal is guided through the central leg portion 29a of the magnetic core 29 extending through the hole 25a formed on the base plate 25 to act efficiently on the record track area 10a of the magnetooptic disc 10. In such a case, with the arrangement in which the magnetic head 26 is mounted on one of the opposite surfaces of the base plate 25 and the capacitance detecting electrode 28 is attached to the other of the opposite surfaces of the base plate 25 to be opposite to the magnetooptic disc 10, the magnetic field generator 17 in its entirety is constituted to be relatively small in size and light in weight and the variations in the space between the magnetic field generator 17 and the magnetooptic disc 10 are easily detected. Further, since the capacitance detecting electrode 28 is provided with the separating cutout 31 which extends linearly to include the portion of the lower surface of the base plate 25 at which the end face of the central leg portion 29a of the magnetic core 29 appears for forming the eddy current loss restraining portion, an eddy current which is induced in the capacitance detecting electrode 28 due to the recording information signal magnetic field generated by the magnetic head 26 is effectively reduced so that the eddy current loss caused in the capacitance detecting electrode 28 is surely restrained.

What is claimed is:

1. An apparatus for generating a magnetic field varying in response to a varying information signal, the apparatus comprising:
    a base plate made of electrical insulating material,
    a magnetic core mounted on one surface of said base plate, said magnetic core having a central leg portion extending through a hole formed in said base plate so as to cause and end face of said central leg portion to be located substantially coplanar with a surface of said base plate opposite said one surface on which said magnetic core is mounted,
    coil means wound on the central leg portion of said magnetic core and supplied with said varying information signal, and
    capacitance detecting electrode means formed as a thin conductive layer attached to the opposite surface of said base plate for opposition to a recording medium having a conductive layer, said thin conductive layer of said capacitance detecting electrode means surrounding and being spaced apart from said end face of said magnetic core, and said capacitance detecting electrode means being provided with means for restraining eddy current loss caused in said capacitance detecting electrode means.

2. An apparatus according to claim 1, wherein said means for restraining eddy current loss comprises a separating cutout formed through said capacitance detecting electrode means.

3. An apparatus according to claim 2, wherein said separating cutout extends linearly to expose a portion of the opposite surface of said base plate at which the end face of the central leg portion of said magnetic core is located.

4. An apparatus according to claim 2, wherein said capacitance detecting electrode means is formed to cover substantially all of the opposite surface of said base plate with the exception of portions corresponding to said separating cutout.

* * * * *

UNITED STATES PATENT AND TRADEMARK OFFICE
CERTIFICATE OF CORRECTION

PATENT NO.  : 5,111,441
DATED       : May 5, 1992
INVENTOR(S) : Hiroshi Eto, Nobuyuki Oka, Takehiro Nagaki It is certified that error appears in the above-indentified patent and that said Letters Patent is hereby corrected as shown below:

```
Col. 1, line  9, after "generating" insert  --a--
Col. 2, line 66, change "would be" to --is--
        same line, change "is" to --would be--
Col. 3, line 65, delete "substantially"
Col. 5, line  5, after "16" insert --,--
        line 39, after "as" insert --to--
```

In the Claims:
Col. 7, line 33, change "and" to --an--

Signed and Sealed this

Tenth Day of January, 1995

Attest:

BRUCE LEHMAN

Attesting Officer         Commissioner of Patents and Trademarks